United States Patent
Gupta et al.

(10) Patent No.: US 11,816,147 B2
(45) Date of Patent: Nov. 14, 2023

(54) ENHANCED IMAGE-SEARCH USING CONTEXTUAL TAGS

(71) Applicant: ADOBE INC., San Jose, CA (US)

(72) Inventors: Subham Gupta, Uttarakhand (IN); Poonam Bhalla, New Delhi (IN); Krishna Singh Karki, New Delhi (IN); Ajay Bedi, Himachal Pradesh (IN)

(73) Assignee: Adobe Inc., San Jose, CA (US)

( * ) Notice: Subject to any disclaimer, the term of this patent is extended or adjusted under 35 U.S.C. 154(b) by 140 days.

(21) Appl. No.: 16/683,929

(22) Filed: Nov. 14, 2019

(65) Prior Publication Data

US 2021/0149947 A1 May 20, 2021

(51) Int. Cl.
| | |
|---|---|
| G06F 16/55 | (2019.01) |
| G06F 16/58 | (2019.01) |
| G06F 16/587 | (2019.01) |
| G06F 16/532 | (2019.01) |
| G06F 16/535 | (2019.01) |
| G06F 16/583 | (2019.01) |

(52) U.S. Cl.
CPC ............ *G06F 16/55* (2019.01); *G06F 16/532* (2019.01); *G06F 16/535* (2019.01); *G06F 16/583* (2019.01); *G06F 16/587* (2019.01); *G06F 16/5866* (2019.01)

(58) Field of Classification Search
CPC .... G06F 16/55; G06F 16/5866; G06F 16/587; G06F 16/535; G06F 16/532
See application file for complete search history.

(56) References Cited

U.S. PATENT DOCUMENTS

| | | | |
|---|---|---|---|
| 2012/0233531 A1* | 9/2012 | Ma | G11B 27/322 715/205 |
| 2019/0042585 A1* | 2/2019 | Ploshykhyn | G06F 16/24578 |
| 2019/0220694 A1* | 7/2019 | Biswas | G06K 9/6202 |
| 2019/0220967 A1* | 7/2019 | Bhatt | G06N 3/0454 |
| 2021/0073269 A1* | 3/2021 | Spiry | G06F 16/55 |

FOREIGN PATENT DOCUMENTS

CN    106201184 A    * 12/2016

* cited by examiner

*Primary Examiner* — Hosain T Alam
*Assistant Examiner* — Anthony G Gemignani
(74) *Attorney, Agent, or Firm* — SHOOK, HARDY & BACON L.L.P.

(57) ABSTRACT

Embodiments of the present invention are directed towards providing contextual tags for an image based on a contextual analysis of associated images captured in the same environment as the image. To determine contextual tags, content tags can be determined for images. The determined content tags can be associated with categories based on a contextual classification of the content tags. These associated content tags can then be designated as contextual tags for a respective category. To associate these contextual tags with the images, the images can be iterated through based on how the images relate to the contextual tags. For instance, when an image is associated with a category, the contextual tags classified into that category can be assigned to that image.

20 Claims, 9 Drawing Sheets

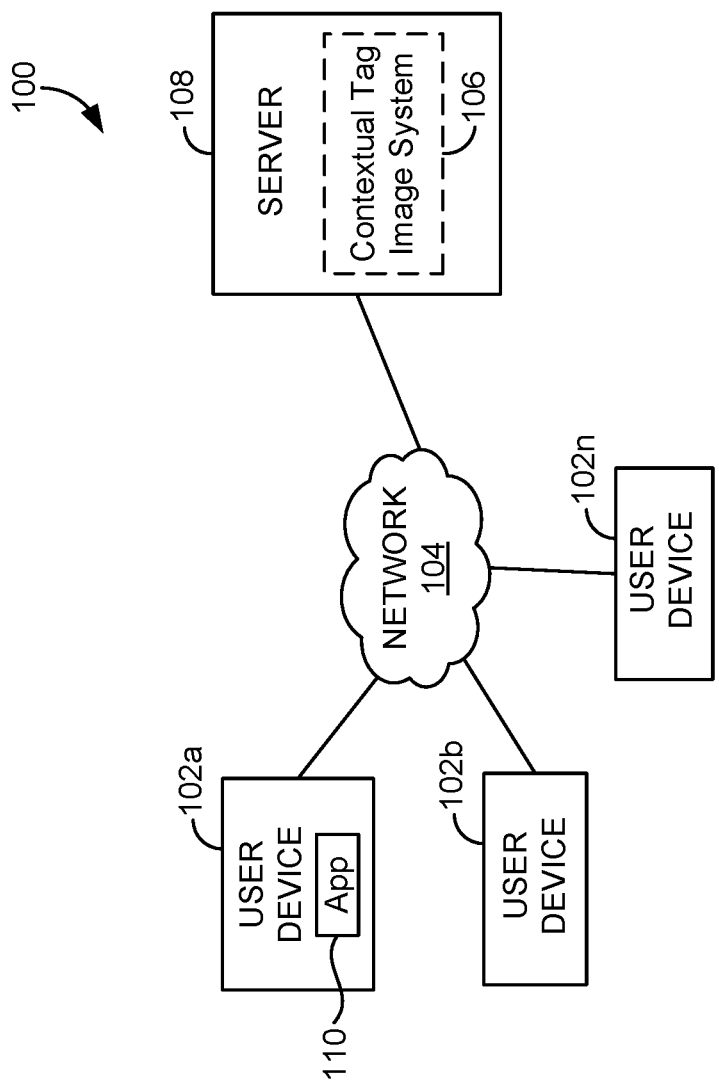

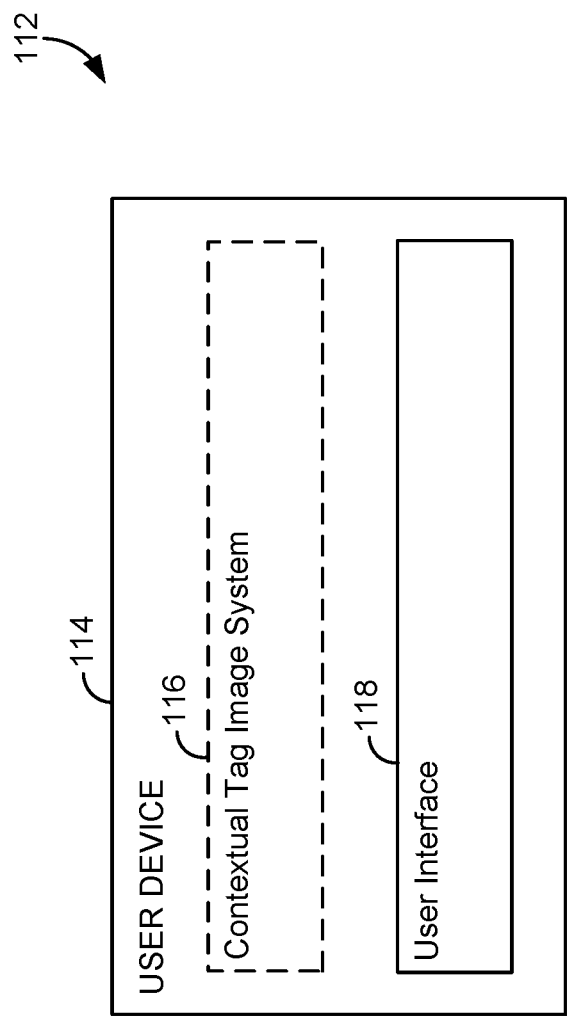

ENHANCED IMAGE-SEARCH USING CONTEXTUAL TAGS

BACKGROUND

Users often desire that their photos be cataloged in an easy to search manner. In particular, users desire that specific photos of interest can be easily found later after the photos are stored. For instance, when searching stored photos for a specific feature of interest (e.g., "Paris"), photos of Paris should be identified and provided. One manner for searching photos stored in a catalog is using photo tags. Photo tags can identify various items that appear in a photo. For example, a photo of a person holding a dog can have associated photo tags "person" and "dog." Accordingly, photo tags can be used to search stored photos that have photo tags corresponding to a specific searched feature of interest.

SUMMARY

Embodiments of the present disclosure are directed towards identifying contextual tags for images. Such contextual tags can provide supplemental information for efficiently and accurately identifying images of interest during searches. In particular, contextual tags can be used to identify images that do not visibly contain a feature of interest but were captured in the same environment as associated images that do contain the feature of interest.

Contextual tags can be identified for images based on a contextual analysis of the associated images captured in the same environment. In particular, to determine contextual tags, images can be clustered into related groups. These related groups can be created by clustering based on location and time. Upon generating clusters of images, content-based tags (e.g., content tags) can be determined for the images in a cluster. Such content tags can be generated using the content and metadata of an image. Upon generating the content tags for the images in the cluster, the content tags can be classified based on context. For instance, the content tags can be classified based on their relationship to one or more categories (e.g., event category and/or location category). Content tags that relate to a category can be added to a list of contextual tags associated with the respective category.

Images in the cluster can then be associated with these contextual tags based on how the images relate to a particular category. In particular, when an image has content tags that are part of the contextual tags in a list of contextual tags for a category, the image can be associated with that category. When an image is not associated with a category based on its content tags (i.e., none of the content tags match the tags in a list of contextual tags for one of the categories), the image can be analyzed based on its relationship to the images previously associated with each category. In particular, content tags of the image can be compared with the content tags of the images associated with categories. Using this comparison, a determination can be made as to how relevant a category (e.g., location or event) is to the image. Based on this relevancy, the image can be associated with a most relevant category (e.g., determined based on overlap between content tags). When an image is associated with a category, the list of contextual tags classified into the category can be assigned to that image as contextual tags. In this way, searches can be performed that can identify images based on these assigned contextual tags.

BRIEF DESCRIPTION OF THE DRAWINGS

FIG. 1A depicts an example configuration of an operating environment in which some implementations of the present disclosure can be employed, in accordance with various embodiments.

FIG. 1B depicts another example configuration of an operating environment in which some implementations of the present disclosure can be employed, in accordance with various embodiments.

DETAILED DESCRIPTION

Figure 2:
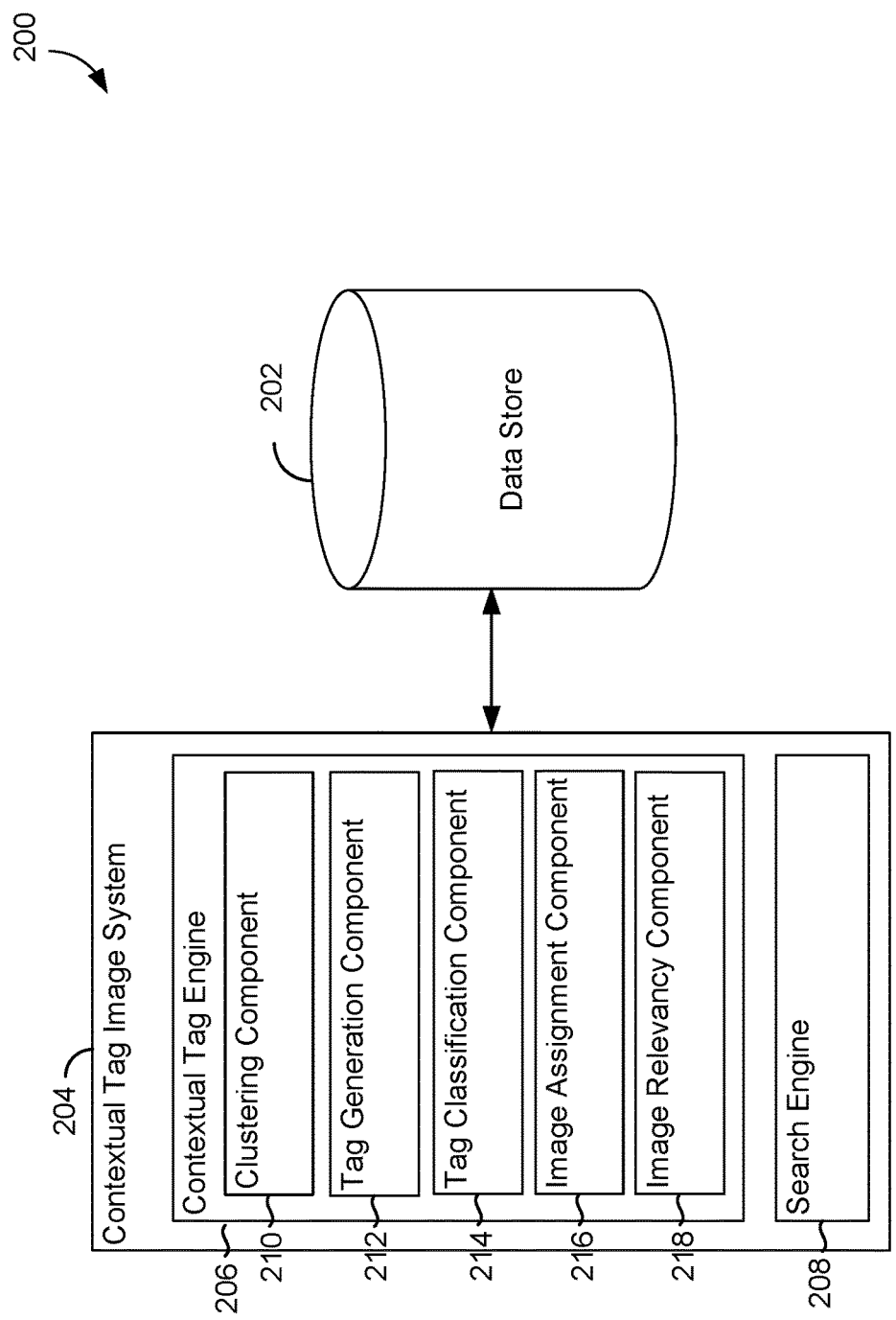
FIG. 2 depicts a further example configuration of an operating environment in which some implementations of the present disclosure can be employed, in accordance with various embodiments of the present disclosure.

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Oftentimes, users desire that specific photos of interest can be easily found after being stored in a catalog. For example, identifying photos taken at the beach when searching for "beach" or identifying photos taken at a wedding of a friend when searching for "bride and groom." Conventional methods for identifying photos of interest often rely on matching a search term with photo tags. Photo tags can be automatically generated based on items that appear in a photo (e.g., tagging "bird" in a photo of a parrot) and/or manually entered (tagging a photo with "Best Friends Trip 2019").

Automatic generation of tags can identify various items that appear in a photo and then tag those items. Such automatically generated tags (i.e., auto-tags) depend entirely on the content and metadata of a specific photo. In particular, auto-tags are computed based on items that are visible in a photo. Relying on the visual content of a photo to determine tags for the photo often results in important tags not being assigned to the photo. Missing important tags often results in multiple searches to identify photos of interest because photos will fail to be identified for a search, which is computationally inefficient. Thus, conventional automatic tagging methods for images often result in inaccurate and inefficient searching.

Manual generation of tags can assign any tag to a photo. However, such manual methods of tagging photos are burdensome and require a user to spend a large amount of time and thought to identify and tag photos. For instance, manually tagging photos from a trip where hundreds of photos were taken will take a vast about of time and thought. In addition, users often forget or miss a tag for a photo leading to inconsistent and/or inaccurate tagging of photos. Such inconsistent and/or inaccurate tagging often results in multiple searches to identify specific photos of interest, which is computationally inefficient. Thus, such conventional tagging methods for photo search often result in inaccurate and inefficient searching.

As such, conventional methods for tagging photos have had limited success. In particular, conventional automatic tagging methods only tag items that appear in a photo. Further, conventional manual tagging methods are time consuming and often lead to forgotten or missed tags for a photo. As such, conventional methods fail to provide accurate and efficient tagging for use when searching photos in a database.

Accordingly, embodiments of the present disclosure present a solution for improving image search system functionality using context-based tagging. In particular, contextual tags can be assigned to an image based on a contextual analysis of associated images captured in the same environment as the image. Such context-based tags are advantageous because contextual tags provide additional search terms associated with a specific image beyond merely tags based on the content and metadata of the specific image (e.g., content tags). In this way, contextual tags can supplement conventionally generated content tags (e.g., based on the content and metadata of the specific image). For example, when using conventional content-based tags, if a feature of interest (e.g., searched feature) is not visibly present in an image, that image will not be returned for a search related to the feature of interest. Using contextual tags ensures that such an image will be returned even if the feature of interest is not visibly present in the image. As an example, a person standing near a pool where the pool is not visible in the image can have a contextual tag "pool" such that when a user searches for "pool" the image is still returned.

Such context-based tagging is advantageous because it allows for more intuitive searching of photo databases. For instance, when searching for images taken during a birthday party, images will be returned even if nothing in an image is visually associated with the birthday party (e.g., birthday cake or birthday decorations are not visible in the images). Advantageously, context-based tagging also supports more efficient searching for images in a photo database. In particular, by providing images associated with contextual tags, fewer search iterations can be performed, reducing the computing operations needed to identify and provide images related to a searched feature of interest. In addition, context-based tagging is advantageous because it increases the accuracy of provided images based on a search. For instance, context-based tagging reduces the amount of searching interactions needed to find photos of interest by providing not just images that visually contain a feature of interest but by also providing images associated with the feature of interest (e.g., indicated by contextual tags).

At a high level, some implementations of the technology described herein can identify contextual tags for images in a database. Such contextual tags can provide supplemental information for efficiently and accurately identifying images of interest during searches of the database. In particular, contextual tags can be used to identify images captured in the same environment as associated images that contain a feature of interest (e.g., where the associated images visually contain the feature of interest or contain the feature of interest in image metadata). Contextual tags for images can be identified and assigned to an image based on a contextual analysis of the associated images captured in the same environment.

In more detail, a contextual analysis of images in a database can be performed to identify contextual tags for the images. In particular, to identify contextual tags, images can be clustered into related groups. In some embodiments, the related groups can be based on location and time. Upon generating clusters of images, content tags can be determined for the images in a cluster. Such content tags can be based on the content and metadata of an image. Upon determining the content tags for the images in the cluster, the content tags can be classified based on context. For instance, the content tags can be classified based on their relationship to an event category and/or a location category. Content tags that relate to the location category can be added to a location category tag list, whereas content tags that relate to the event category can be added to an event category tag list. The content tags added to these lists can be designated as contextual tags (e.g., contextually related to either event or location) for that category, as further discussed below. These contextual tags can then be associated with images in the cluster based on how the images relate to the event category and/or the location category.

In further detail, to identify contextual tags for images in a cluster, the relationship between the images in the cluster and various categories can be analyzed. In one embodiment, a multi-layered relationship graph can be created for each cluster of images. Such a multi-layered relationship graph can be used to transfer tags to images from other associated images within a cluster. In particular, the tags of the images of the cluster can be classified into a category (e.g., location, event, etc.). For instance, content tags classified into a location category can be added as contextual tags for the location category. Further, the content tags classified into an event category can be added to the event category as contextual tags.

To associate contextual tags with images, the images in the cluster can be iterated through based on how the images relate to the classified tags. For instance, images in the cluster can be iterated through based on the multi-layered relationship graph. If an image has content tags that relate to the contextual tags in the location category, the image can be associated with the location category. If an image has content tags that are part of the contextual tags in the event category, the image can be associated with the event category.

Next, to further associate contextual tags with images, images in the cluster can be iterated through based on how the images relate to the images previously associated with the categories. In particular, images that were not associated with either the location category or the event category (e.g., based on their content tags not matching context tags in either category) can be analyzed based on how the images relate to each category (e.g., location and event). For instance, content tags of an image (e.g., not associated with either the location category or the event category) can first be compared with the content tags of the images associated with the location category. Next, the content tags of the image can be compared with the content tags of the images associated with the event category. In this comparison, an overlap can be determined between the content tags of the image and the content tags of the images associated with the respective categories (e.g., content tags of the images associated with the location category and the content tags of the images associated with the event category). Using this comparison, a determination can be made as to how relevant a category (e.g., location or event) is to the image. Based on this relevancy, the image can be associated with the most relevant category (e.g., determined based on overlap between content tags).

When an image is associated with a category, the contextual tags classified into the category can be assigned to that image. Because the images in a cluster have been grouped based on relationship (e.g., location and time), when the images of the cluster are then associated with a category (e.g., location or event based on relevancy to the categories), the contextual tags of the category can provide supplemental information for more easily identifying the images. In particular, the contextual tags of the category (e.g., based on content tags of associated images classified in the same category) can be used to identify an image that does not visually contain a feature of interest but is related to another image in the same category that does contain the feature of interest.

In this way, searches can be performed that can identify images based on associated contextual tags. In particular, a search can be received that identifies a feature of interest (e.g., using a search keyword). During the search using a keyword (e.g., "swimming pool") that matches with a contextual tag (e.g., "pool"), the images associated with a category containing the contextual tag can be identified in addition to images that contain the contextual tag (e.g., "pool") that matches the keyword.

FIG. 1A depicts an example configuration of an operating environment in which some implementations of the present disclosure can be employed, in accordance with various embodiments. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 8.

It should be understood that operating environment 100 shown in FIG. 1A is an example of one suitable operating environment. Among other components not shown, operating environment 100 includes a number of user devices, such as user devices 102a and 102b through 102n, network 104, and server(s) 108. Each of the components shown in FIG. 1A may be implemented via any type of computing device, such as one or more of computing device 800 described in connection to FIG. 8, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and other components may be employed within operating environment 100 within the scope of the present disclosure. Each may comprise a single device or multiple devices cooperating in a distributed environment.

User devices 102a through 102n can be any type of computing device capable of being operated by a user. For example, in some implementations, user devices 102a through 102n are the type of computing device described in relation to FIG. 8. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 110 shown in FIG. 1A. Application 110 is referred to as a single application for simplicity, but its functionality can be embodied by one or more applications in practice. As indicated above, the other user devices can include one or more applications similar to application 110. As an example, application 110 can be any one of ADOBE LIGHTROOM, ADOBE PHOTOSHOP ELEMENTS, ADOBE PHOTOSHOP EXPRESS, and/or ADOBE STOCK.

The application 110 may generally be any application capable of facilitating the exchange of information between the user devices and the server(s) 108 in identifying contextual tags for images based on a contextual analysis of associated images captured in the same environment. In some implementations, the application 110 comprises a web application, which can run in a web browser, and could be hosted at least partially on the server-side of environment 100. In addition, or instead, the application 110 can comprise a dedicated application, such as an application having image processing functionality. In some cases, the application 110 is integrated into the operating system (e.g., as a service). It is therefore contemplated herein that "application" be interpreted broadly.

In accordance with embodiments herein, the application 110 facilitates identifying contextual tags for images based on a contextual analysis of associated images captured in the same environment. In embodiments, a search can be received. Based on the search, images can be retrieved. The images can be selected from a repository, for example, a repository stored in a data store accessible by a network or stored locally at the user device (e.g., user device 102a). Based on the search, (e.g., provided via a user device or server), contextual tags can be used to identify images. Such contextual tags can be based on a contextual analysis. Images identified for a search, using the contextual tags, can be output to a user, for example, to the user via the user device 102a. In particular, such identified images can be output as results of the search. In this regard, the identified images can be displayed via a display screen of the user device.

As described herein, server 108 can identifying contextual tags for images based on a contextual analysis of associated images captured in the same environment via contextual tag image system 106. Server 108 includes one or more processors, and one or more computer-readable media. The computer-readable media includes computer-readable instructions executable by the one or more processors. The instructions may optionally implement one or more components of contextual tag image system 106, described in additional detail below.

For cloud-based implementations, the instructions on server 108 may implement one or more components of contextual tag image system 106, and application 110 may be utilized by a user to interface with the functionality implemented on server(s) 108. In some cases, application 110 comprises a web browser. In other cases, server 108 may not be required, as further discussed with reference to FIG. 1B. For example, the components of continuity detection system 106 may be implemented completely on a user device, such as user device 102a. In this case, contextual tag image system 106 may be embodied at least partially by the instructions corresponding to application 110.

Referring to FIG. 1B, aspects of an illustrative contextual tag image system are shown, in accordance with various embodiments of the present disclosure. FIG. 1B depicts a user device 114, in accordance with an example embodiment, configured to allow for identifying contextual tags for images based on a contextual analysis of associated images captured in the same environment using a contextual tag image system 116. The user device 114 may be the same or similar to the user device 102a-102n and may be configured to support the contextual tag image system 116 (as a standalone or networked device). For example, the user device 114 may store and execute software/instructions to facilitate interactions between a user and the contextual tag image system 116 via the user interface 118 of the user device.

FIG. 2 depicts another example configuration of an operating environment in which some implementations of the present disclosure can be employed, in accordance with various embodiments of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 8. It should be understood that operating environment 200 shown in FIG. 2 is an example of one suitable operating environment. Among other components not shown, operating environment 200 includes a number of user devices, networks, and server(s).

Contextual tag image system 204 includes contextual tag engine 206 and search engine 208. The foregoing engines of contextual tag image system 204 can be implemented, for example, in operating environment 100 of FIG. 1A and/or operating environment 112 of FIG. 1B. In particular, those engines may be integrated into any suitable combination of user devices 102a and 102b through 102n and server(s) 108 and/or user device 114. While the various engines are depicted as separate engines, it should be appreciated that a single engine can perform the functionality of all engines. Additionally, in implementations, the functionality of the engines can be performed using additional engines and/or components. Further, it should be appreciated that the functionality of the engines can be provided by a system separate from the contextual tag image system.

As shown, contextual tag image system 204 may operate in conjunction with data store 202. Data store 202 can store computer instructions (e.g., software program instructions, routines, or services), data, and/or models used in embodiments described herein. In some implementations, data store 202 can store information or data received via the various engines and/or components of contextual tag image system 204 and provide the engines and/or components with access to that information or data, as needed. Although depicted as a single component, data store 202 may be embodied as one or more data stores. Further, the information in data store 202 may be distributed in any suitable manner across one or more data stores for storage (which may be hosted externally).

In embodiments, data stored in data store 202 may include images, videos, content tags, and contextual tags. In particular, an image can be stored along with associated information. This associated information can include location and time. Location can be based on location metadata associated with an image. For instance, location metadata can be based on GPS location. Time can be based on the time stamp at which an image was captured. In addition, the associated information can include content tags. Content tags can be tags based on the content and metadata of an image. Further, the associated information can include contextual tags. Contextual tags can be assigned to the image based on the relevancy of the image to a category, as discussed further with reference below. In some cases, data store 202 receives data from user devices (e.g., a search request sent by user device 102a or another device associated with a user, via, for example, application 110). In other cases, data is received from one or more data stores in the cloud.

Contextual tags can be identified for images received by contextual tag image system 204. The images may be received, for instance, from a user at a user device. The user may select or input images in any available manner. For example, a user may take a picture using a camera on a device, for example, user device 102a-102n and/or user device 114 of FIGS. 1A-1B. As another example, a user may select an image from a repository stored in a data store accessible by a network or stored locally at the user device 102a-102n and/or user device 114 of FIG. 1A-1B. In other embodiments, a user can input the image by inputting a link or URL to an image. Such an image can be, for example, a frame from a video. The contextual tag image system 204 can analyze the images to identify contextual tags based on associated images captured in the same environment. The contextual tag image system 204 can then use the contextual tags when identifying images related to a search.

Contextual tag engine 206 analyzes images to identify contextual tags based on associated images. In particular, the contextual tag engine 206 can be used to analyze images to identify contextual tags based on associated images captured in the same environment. To determine contextual tags, images can be clustered into related groups. Upon generating the clusters of images, content tags can be determined for the images in a cluster. For a cluster, the determined content tags can then be associated with categories based on a contextual classification of the content tags. These associated content tags can be designated as contextual tags associated with a category based on the contextual classification. To specifically associate these contextual tags with images, the images in the cluster can be iterated through based on how the images relate to the contextual tags. For instance, when an image is associated with a category, the contextual tags classified into that category can be assigned to that image. Such functionality to identify contextual tags is described in further detail below.

As depicted, contextual tag engine 206 includes clustering component 210, tag generation component 212, tag classification component 214, image assignment component 216, and image relevancy component 218. The foregoing components of contextual tag engine 206 can be implemented, for example, in operating environment 100 of FIG. 1A and/or operating environment 112 of FIG. 1B. In particular, those components may be integrated into any suitable combination of user devices 102a and 102b through 102n and server(s) 108 and/or user device 114. While the various components are depicted as separate components, it should be appreciated that a single component can perform the functionality of all components. Additionally, in implementations, the functionality of the components can be performed using additional components and/or engines. Further, it should be appreciated that the functionality of the components can be provided by an engine separate from the contextual tag engine.

Clustering component 219 clusters images. In particular, the clustering component can cluster images in a catalog into related groups. Such clustering can be performed in relative to location and/or time. Location can be based on location metadata associated with an image. For instance, location metadata can be based on a GPS location captured by a computing device (e.g., camera) when the image was taken. Time can be based on a time stamp indicated by a computing device (e.g., camera) when an image was captured.

In some embodiments, to perform the clustering each image can initially be treated as a separate cluster. Each cluster (e.g., image) can then be moved behind other clusters (e.g., images) to generate a tree based structure. This tree based structure can indicate how the various clusters (e.g., images) related to one another). For example, such clustering can be performed using a hierarchical agglomerative clustering technique. To determine when to combine clusters (e.g., if images should belong in the same cluster), various intracluster distances can be used. For instance, in some embodiments, clustering can be performed based on parameters that result in a maximal intracluster distance.

Clustering can be performed using any manner. In one embodiment, clustering can be performed by first comparing the time stamps of images and then projecting the images into a timeline based on temporal distance. Next, location can be compared using location-based metadata using a Haverfine distance (e.g., computing the distance between two points based on latitude and longitude). In this way, clustering can be performed based on a location within a specific time period. In another embodiment for clustering, clustering can first be performed based on location and then be performed based on time. In this way, clustering can be based on a time and then each time-based cluster can be clustered based on location.

Tag generation component 212 generates content tags for clusters. In particular, the tag generation component can generate content tags for each image in a cluster. Such content tags can be based on the content and metadata of an image. Content tags can be determined using various methods. For instance, in some implementations, tag generation component 212 can use a deep neural network to extract features from an image for classification. These extracted features can then be encoded into representations that are classified into outputs (i.e., tags). One example of such a deep neural network that can be used to generate tags can be a metamodel trained to tag images (e.g., Project Haystack). In one embodiment, a convolutional neural network can extract features pertinent to an image. These features can then be encoded to compact the representation. A K Nearest Neighbor algorithm can then be used to identify a cluster for an image based on the encoded features. Finally, based on the identified cluster (e.g., based on key aspects of the image represented by extracted features), the image can be classified. Such classification can identify one or more content tags for the image.

Tag classification component 214 classifies the content tags. In particular, tag classification component can classify the content tags based on context. For instance, the content tags can be classified based on contextual category. In some embodiments, the content tags can be filtered to remove non-nouns. Filtering to remove non-nouns can remove content tags that are not relevant to the contextual tag identification process. Such filtering can be performed using, for example, WordNet. WordNet is a lexical database related to the English language. In particular, WordNet can group words into sets of synonyms, can identify relationships between words, can classify words, etc. Some examples of relationships between words are that "furniture" can be related to "sofa" or table" and "garden" can be related to "plant" or "grass." The remaining content tags (e.g., content tags that are nouns) can then be stored in a tag list.

Next, the remaining content tags in the tag list can be classified into a category. Such classification can be based on event and/or location. For instance, the content tags in the tag list can be analyzed based on their relationship with one or more categories to determine if a content tag relates to a particular category (e.g., a location category or an event category). As an example, WordNet super-subordinate relationships (e.g., hypernym) can be used to classify the tags based on a relationship to either location and/or event. As an example, a content tag "park" can be classified as belonging to the location category and a content tag "birthday" can be classified as belonging to the event category. Content tags in the tag list that relate to the location category can be added to a location category list (e.g., as a list of contextual tags associated with the location category). Content tags in the tag list that relate to the event category can be added to an event category list (e.g., a list of contextual tags associated with the event category).

Image assignment component 216 assigns images to a category. In particular, image assignment component 216 can associate images with a particular category. Images associated with a category can then be used to identify contextual tags associated with the category and/or other images that should be associated with the category. In some embodiments, a multi-layered relationship graph can be created and used to associate images with a particular category.

A multi-layered relationship graph can be created for each cluster. In this way, such a multi-layered relationship graph can be used to transfer content tags from associated images to other images within the cluster (e.g., as contextual tags). The top node in such a multi-layered relationship graph can be a root node (e.g., top-parent node) that contains all images (and associated content tags) in the cluster (e.g., a cluster node). The next layer in the graph can be a contextual category layer that can include three major categories: location category, event category, and non-contextual category. The content tags in the location category list and the event category list, as determined above, can be iterated through and added to its corresponding category (i.e., location, event, or non-contextual) as contextual tags (e.g., as a contextual tag layer). For instance, the content tags in the location category list can be added to the location category as a list of contextual tags. Further, the content tags in the event category list can be added to the event category as a list of contextual tags. Finally, the content tags that do not belong to either the location or event category list can be added to the non-context category.

The images can then be iterated through based on the multi-layered relationship graph. If an image has content tags that are part of the contextual tags of a category, the image can be added to an associated asset list (e.g., as part of an image asset layer). In particular, if an image has content tags that are part of the contextual tags in the location category, the image can be added to a location based asset list (e.g., A(lt). If an image has content tags that are part of the contextual tags in the event category, the image can be added to an event based asset list (e.g., A(et)). Other images that do not have content tags that are not part of the contextual tags in the location category or the contextual tags in the event category are skipped (e.g., not added to either the location based asset list or the event based asset list).

Image relevancy component 218 assigns images to a category based on relevancy. When an image is associated with a category, the contextual tags classified into the category can be assigned to that image. In particular, to associate images with a category, the images that were not added to the location based asset list or the event based asset list can be analyzed. Content tags of such images can be compared with the content tags of the images in the location based asset list and the event based asset list. For instance, the overlap between the content tags of an image and the content tags of the images in the location based asset list and a number of the tags of the images in the event based asset list can be determined. This overlap (e.g., count) can be normalized by dividing the calculated count by the maximum overlap. Normalizing this count can remove bias when one category contains more tags than another category. This normalized count can then be used as a relevancy score for each image in relation to the category. The relevancy score can be used to determine whether to add the image to the location category (e.g., the location based asset list) or the event category (e.g., event based asset list). Further, the relevancy score can then be used to sort images in the location based asset list and the event based asset list (e.g., based on relevancy to the category).

Search engine 208 can perform searches for images. In particular, the search engine 208 can identify images (e.g., based on a search term). For instance, during a search using a keyword that matches with a contextual tag, the images under the category umbrella containing the contextual tag can be identified (e.g., shown to the user as search results). During the search using a keyword (e.g., "swimming pool") that matches with a contextual tag (e.g., "pool"), the images associated with a category containing the contextual tag can be identified in addition to images that contain the contextual tag (e.g., "pool") that matches the keyword.

Figure 3:
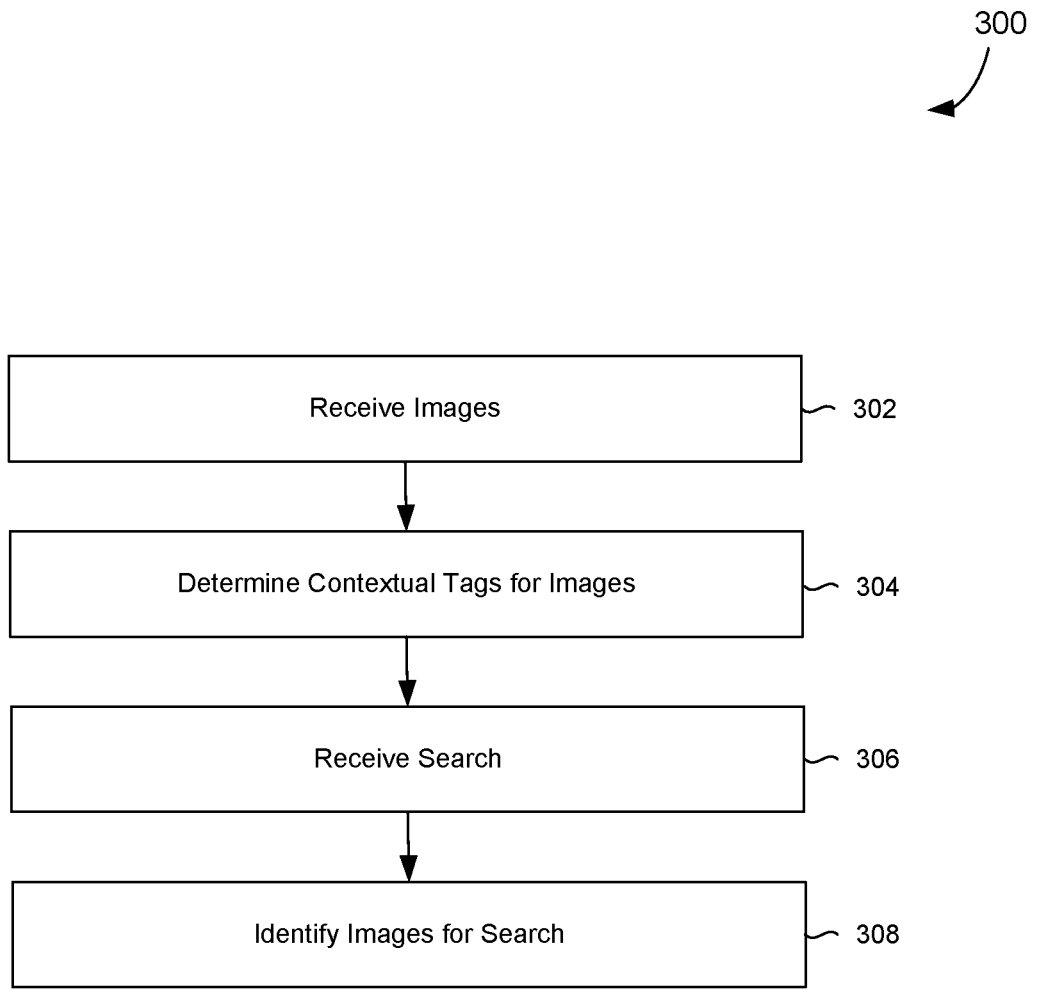
FIG. 3 depicts a process flow showing an embodiment of determining contextual tags for use in searching images, in accordance with various embodiments of the present disclosure.

Turning now to FIG. 3, a process flow is provided showing a method 300 depicting an example of determining contextual tags for use in searching images, in accordance with various embodiments of the present disclosure. Process flow 300 can be carried out, for example by a contextual tag image system as discussed with reference to FIGS. 1A, 1B, and 2.

As depicted, process flow 300 begins at block 302 where images are received. Such images can be received from, for example, data store 202 of FIG. 2 and/or from a database stored in the cloud. Such images can have associated information. Associated information for such received images can include location and time. Location can be based on location metadata associated with an image. For instance, location metadata can be based on GPS location. Time can be based on the time stamp at which an image was captured. Further, the associated information can include content tags. Content tags can be based on the content and metadata of an image. Content tags can be generated for images using a variety of techniques, such as those discussed with reference to FIG. 2.

At block 304, contextual tags can be determined for images. Contextual tags for an image can be based on content tags from associated images captured in the same environment as the image. For instance, a content tag "Golden Gate Bridge" from a group of images taken near the Golden Gate Bridge can be assigned as a contextual tag for an image that does not visually contain the Golden Gate Bridge but is associated with the group of images (e.g., based on location and time).

A contextual analysis of the received images can be performed to identify contextual tags for the images. In particular, to determine contextual tags, the images can be clustered. In some embodiments, the images can be clustered based on location and time. Clustering can be performed using a variety of techniques, such as those discussed with reference to FIG. 2.

Upon generating the clusters, content tags for each image in a cluster can be identified. In some embodiments, the content tags can be previously generated and received along with the images as associated information. In other embodiments, content tags can be generated based on the content and metadata of an image. Content tags can be determined using various methods. For instance, in some implementations, a deep neural network can be used to generate content tags. In particular, a convolutional neural network can extract features pertinent to an image. These features can then be encoded into compact representations. These compact representations can then be used to classify the image (e.g., identify tags for the image).

Upon identifying content tags for the images, the content tags can be classified based on context. In particular, the content tags can be classified into contextual categories. Contextual categories are broader spectrum than basic categories. For instance, contextual categories can include, for example, a location or event (e.g., garden, park, wedding, etc.) whereas basic categories are more specified (e.g., grass, tree, boy, etc.). As part of the content tag classification process, the content tags can be filtered to remove non-nouns. The remaining content tags can then be classified based on context. For instance, the content tags can be classified based on their relationship to a specific category (e.g., any number and type of categories can be used). In particular, in some embodiments, the tags can be classified based on their relationship to a location category and/or an event category. For instance, the content tags in the tag list can be analyzed to determine if a content tag relates to a location category or relates to an event category. Content tags in the tag list that relate to the location category can be added to a location category list (e.g., Lt). Content tags in the tag list that relate to the event category can be added to an event category list (e.g., Et).

In some embodiments, a multi-layered relationship graph can be created that can be used to identify contextual tags from images based on associated images. In particular, such a multi-layered relationship graph can relate to a specific cluster of images. To create the multi-layered relationship graph, the top node (e.g., cluster node) can contain all tags in the cluster. The next layer in the graph can include three major categories: location, event, and non-contextual. The content tags in the location category list and the event category list, as determined previously, can be iterated through and added to the corresponding category (i.e., location, event, or non-contextual) as contextual tags for that category. The content tags that do not belong to either the location or event category list can be added to the non-context category.

The images in the cluster can then iterated through based on their relationship(s) to a category as indicated using multi-layered relationship graph. If an image has content tags that are part of the contextual tags in the location category, the image can be added to a location based asset list (e.g., A(lt). If an image has content tags that are part of the contextual tags in the event category, the image can be added to an event based asset list (e.g., A(et)). Other images that do not have content tags that are not part of the contextual tags in the location category or the contextual tags in the event category are skipped (e.g., not added to either the location based asset list or the event based asset list).

Contextual tags can then be associated with image that were not added to an asset list based on relevancy. In particular, content tags of the images that were not added to the location based asset list or the event based asset list can be compared with the content tags of the images in the location based asset list and the event based asset list. For instance, a number of content tags of an image that overlap with the content tags of the images in the location based asset list and a number of the content tags of the images in the event based asset list can be determined. This count can be normalized by dividing the calculated number by the maximum overlap. This normalized count can be the relevancy score for each image in relation to the respective category. The relevancy score can be used to determine whether to add the image in the location based asset list or the event based asset list. Further, the relevancy score can be used to sort the images in the location based asset list and the event based asset list based on the strength of the relationship to the category (e.g., based on the relevancy score).

At block 306, a search can be received. In particular, a keyword can be received. The keyword can indicate an aspect of interest (e.g., feature of interest) for images to return for the search. Keyword should be interpreted broadly to include a word, phrases, and/or any other search terms. For example, the search can be for "birthday."

At block 308, images are identified for the search. In particular, during a search using a keyword that matches with a contextual tag, the images under the umbrella containing the contextual tag can be identified (e.g., shown to the user as search results). For instance, a search for "birthday" will show images containing birthday cake or birthday decorations as well as images with people in them enjoying the birthday party. Such images can be identified based on the images being in an event based asset list that is associated with the contextual tag "birthday"

Figure 4:
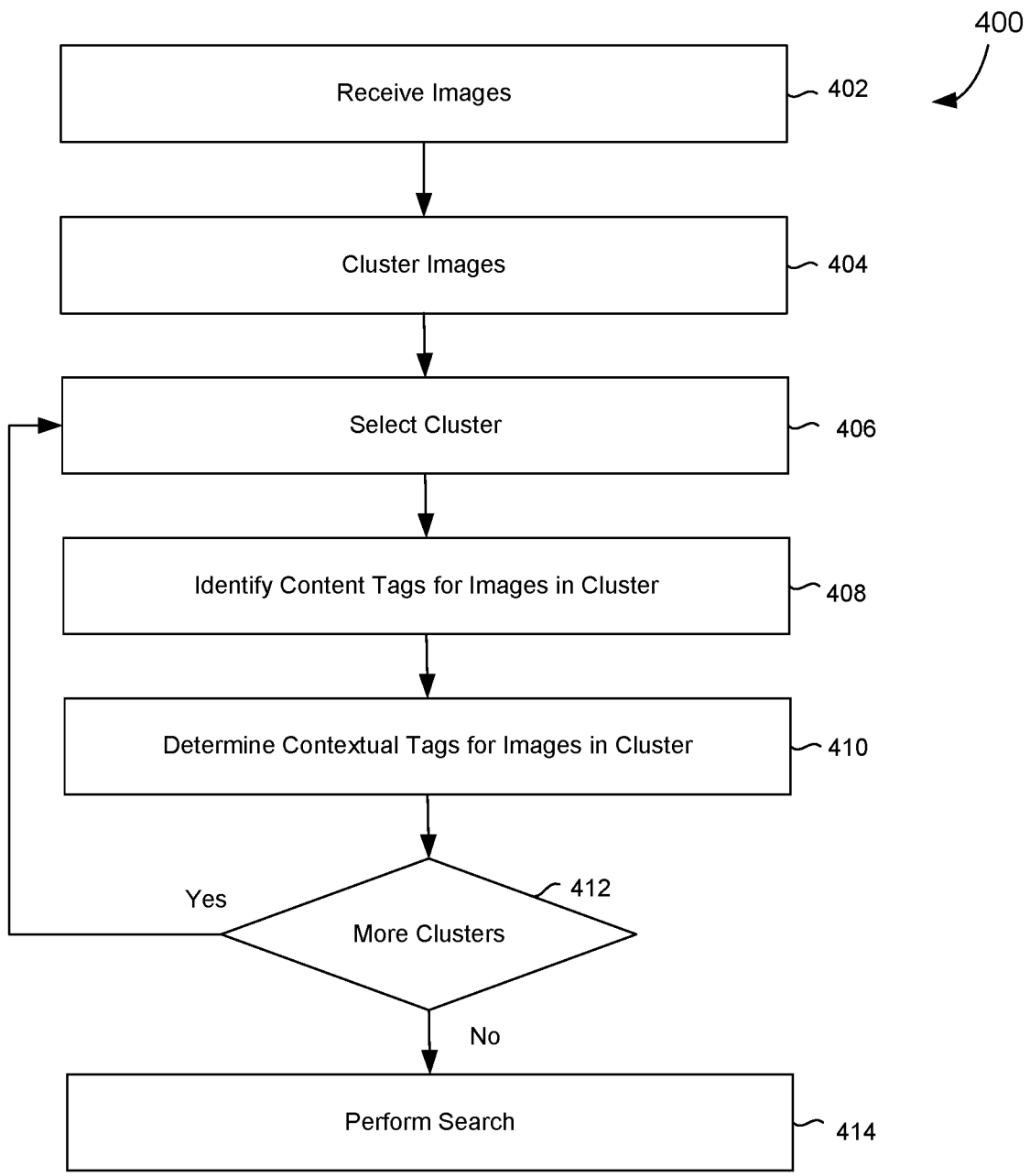
FIG. 4 depicts a process flow showing an embodiment of determining contextual tags for use in searching images, in accordance with various embodiments of the present disclosure.

FIG. 4 provides a process flow showing an embodiment of method 400 depicting an example of determining contextual tags for use in searching images, in accordance with various embodiments of the present disclosure. Such a method can be performed, for instance, using the contextual tag engine 206 in conjunction with search engine 208 of contextual tag image system 204 as described with reference to FIG. 2.

At block 402, images are received. Such images can be received from, for example, data store 202 of FIG. 2 and/or from a database stored in the cloud. Such images can have associated information. Associated information can include location and time. Location can be based on location metadata associated with an image. For instance, location metadata can be based on GPS location. Time can be based on the time stamp at which an image was captured.

At block 404, the images can be clustered. Clustering can be performed using a variety of techniques, such as those discussed with reference to FIG. 2. In particular, clustering can be based on location and/or time. At block 406, a cluster can be selected. In embodiments, a cluster can contain images taken at a location within a specific time period. In other embodiments, a cluster can contain images taken around the same time, near the same location.

At block 408, content tags can be identified for the selected cluster. Content tags can be tags based on the content and metadata of an image. Content tags can be identified for images using a variety of techniques. For instance, in some implementations, a deep neural network can be used to generate content tags. In particular, a convolutional neural network can extract features pertinent to an image. These features can then be encoded into compact representations. These compact representations can then be used to classify the image (e.g., identify content tags for the image).

At block 410, contextual tags can be determined for the cluster. For the cluster, determined content tags can be associated with categories based on a contextual classification of the content tags. These associated content tags can be designated as contextual tags associated with a category. To specifically associate the contextual tags with images, the images in the cluster can be iterated through based on how the images relate to the contextual tags. For instance, when an image is associated with a category, the contextual tags classified into that category can be assigned to that image. In particular, an image can be associated with the category when a content tag of the image matches a contextual tag of the category. An image can also be associated with the category based on an overlap between content tags of the image and content tags of images previously associated with the category.

At block 412, a determination is made as to whether there are more clusters to be analyzed to determine contextual tags. If the result of the determination at block 412 is that there are more clusters to analyze then processing returns to block 406. If the result of the determination at block 412 is that there are not more clusters to analyze then processing continues to block 414.

At block 414, a search can be performed. In particular, a search can be received. For instance, a keyword can be received that indicates an aspect of interest for images to return for the search. Such a keyword should be interpreted broadly to include a word, phrases, and/or any other search terms. Images can be identified for the search. In particular, during a search using a keyword that matches with a contextual tag, the images under the umbrella containing the contextual tag can be identified (e.g., shown to the user as search results).

Figure 5:
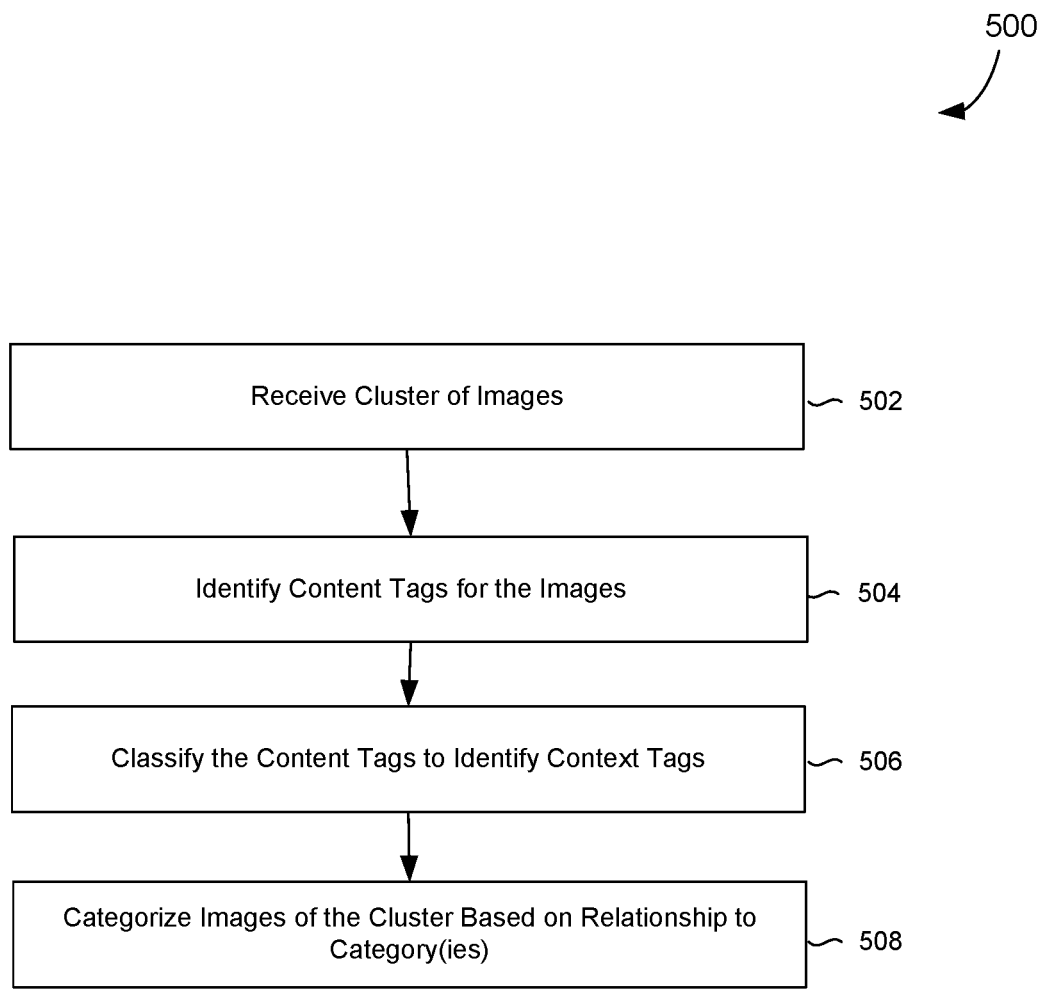
FIG. 5 depicts a process flow showing an embodiment of determining contextual tags for use in searching images, in accordance with various embodiments of the present disclosure.

FIG. 5 provides a process flow showing an embodiment of method 500 depicting an example of determining contextual tags for use in searching images, in accordance with various embodiments of the present disclosure. Such a method can take place using the contextual tag engine 206 of contextual tag image system 204 as described with reference to FIG. 2.

At block 502, a cluster of images is received. Such a cluster can be received from, for example, data store 202 of FIG. 2 and/or from a database stored in the cloud. Such a cluster can be generated using various methods, such as those discussed previously with reference to FIGS. 3 and 4. The images in the cluster can have associated information. Associated information can include location and time. Location can be based on location metadata associated with an image. For instance, location metadata can be based on GPS location. Time can be based on the time stamp at which an image was captured.

At block 504, content tags can be identified for the images. Such images can be the images of the cluster (e.g., received at block 502). Content tags can be tags based on the content and metadata of an image. Content tags can be determined for images using a variety of techniques, as discussed previously with reference to FIGS. 2-4.

At block 506, the content tags can be classified to identify contextual tags. First, the content tags can be classified. In particular, the content tags can be classified based on contextual category. As part of this classification, initially, the content tags can be filtered to remove non-nouns. The remaining content tags can then be stored in a tag list. Next, the remaining content tags in the tag list can be classified. Such classification can be based on event and location. In particular, the tags can be classified based on their relationship to either location and/or event. For instance, the content tags in the tag list can be analyzed based on relationships to determine if a content tag relates to a location category or relates to an event category. Content tags in the tag list that relate to the location category can be added to a location category contextual tag list. Content tags in the tag list that relate to the event category can be added to an event category contextual tag list.

At block 508, the images of the cluster can be categorized based on a relationship with a category. In particular, the images in the cluster can then iterated through based on a multi-layered relationship graph, as discussed with reference to FIGS. 2-3 and 5-6. If an image has content tags that are part of the location category contextual tag list, the image can be added to a location based asset list. If an image has content tags that are part of the event category contextual tag list, the image can be added to an event based asset list. Other images that do not have content tags that are not part of the contextual tags in the location category or the contextual tags in the event category are skipped (e.g., not added to either the location based asset list or the event based asset list).

Contextual tags can then be associated with an image based on relevancy. In particular, the images that were not added to the location based asset list or the event based asset list can be compared with the content tags of the images in the location based asset list and the event based asset list. For instance, a number of tags in an image that overlap with the tags of the images in the location based asset list and a number of the tags of the images in the event based asset list can be determined. The count can be normalized by dividing the calculated count by the maximum overlap. This normalized count can be the relevancy score for each image. The relevancy score can be used to determine whether to add the image in the location based asset list or the event based asset list. Further, the relevancy score can then be used to sort images in the location based asset list and the event based asset list.

Figure 6:
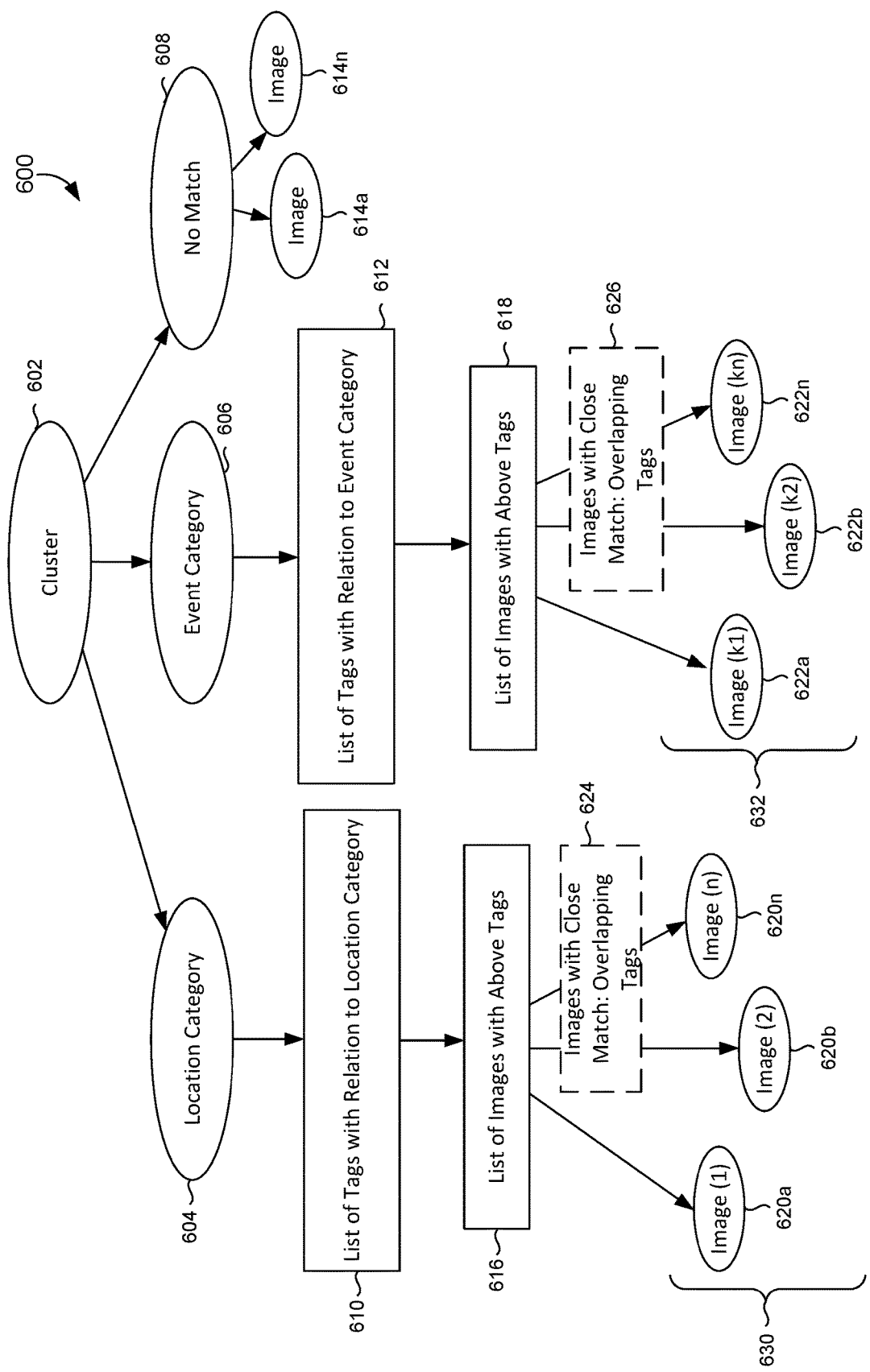
FIG. 6 depicts a process flow showing an example of creating a multi-layered relationship graph for a cluster for use in determining contextual tags, in accordance with various embodiments of the present disclosure.

FIG. 6 provides an example of creating multi-layered relationship graph 600 for a cluster for use in determining contextual tags, in accordance with various embodiments of the present disclosure. Such a method can be performed, for instance, using contextual tag engine 206 as described with reference to FIG. 2.

Such a multi-layered relationship graph 600 can be comprised of a cluster node (e.g., cluster 602). This cluster node can comprise a set of images in a cluster and content tags of the set of images. The multi-layered relationship graph can further comprise a contextual category layer. This contextual category layer can comprise a location category, an event category, and a non-contextual category (e.g., location category 604, event category 606, and no match category 608). In addition, the multi-layered relationship graph can comprise a contextual tag layer. Such a contextual tag layer can comprise a first list of contextual tags related to the location category and a second list of contextual tags related to the event category (e.g., location category list 610 and event category list 612). Further, the multi-layered relationship graph can comprise an image asset layer. The image asset layer can comprise a first list of images associated with the location category and a second list image images associated with the event category (e.g., location based asset list 616 comprising one or more of location-associated images 630 and event based asset list 618 comprising one or more of event-associated images 632). Each of the first list of images associated with the location category and the second list image images associated with the event can have associated content tags related to the images in the lists (e.g., content tags associated with location based asset list 616 and content tags associated with event based asset list 618). Finally, the multi-layered relationship graph can comprise an associated image layer. This associated image layer can comprise the first list of images associated with the location category further comprising images assigned to the location category and the second list of images assigned to the event category further comprising images assigned to the event category (e.g., location-associated images 630 and event-associated images 632).

In more detail, tags associated with cluster 602 can be analyzed. In particular, the associated tags can be analyzed based on category. Such an analysis can be performed using methods as previously discussed, for example, with reference to FIGS. 2-5. Categories can include location category 604, event category 606, and no match category 608. Tags related to location category 604 can be added to location category list 610. Tags related to event category 606 can be added to event category list 612. Tags that are not related to location category 604 or event category 606 can be categorized under no match category 608.

Further, images of cluster 602 can be iterated through based on multi-layered relationship graph 600. If an image has content tags that are part of the contextual tags in the location category list 610, the image can be added to location based asset list 616. Such images in location based asset list 616 can include any of images 620a-620n of location-associated images 630. If an image has content tags that are part of the contextual tags in the event category list 612, the image can be added to an event based asset list 618. Such images in event based asset list 618 can include any of images 622a-622n of event-associated images 632.

Images that do not have content tags that are part of the contextual tags in the location category list 610 or the contextual tags in the event category list 612 are then analyzed. In particular, tags of these images can be compared with the tags of the images in the location based asset list 616 and the event based asset list 618. For instance, a number of tags in an image that overlap with the tags of the images in the location based asset list 616 and a number of the tags of the images in the event based asset list 618 can be determined. The count can be normalized by dividing the calculated count by the maximum overlap. This normalized count can be the relevancy score for each image. The relevancy score can be used to determine whether to assign the image in the location-associated images 630 or the event-associated images 632. Further, the relevancy score can then be used to sort images in the location-associated images 630 or the event-associated images 632. Such additional images added to the location based asset list 616 can include any of images 620a-620n of location-associated images 630. Such additional images added to the event based asset list 618 can include any of images 622a-622n of event-associated images 632.

Figure 7:
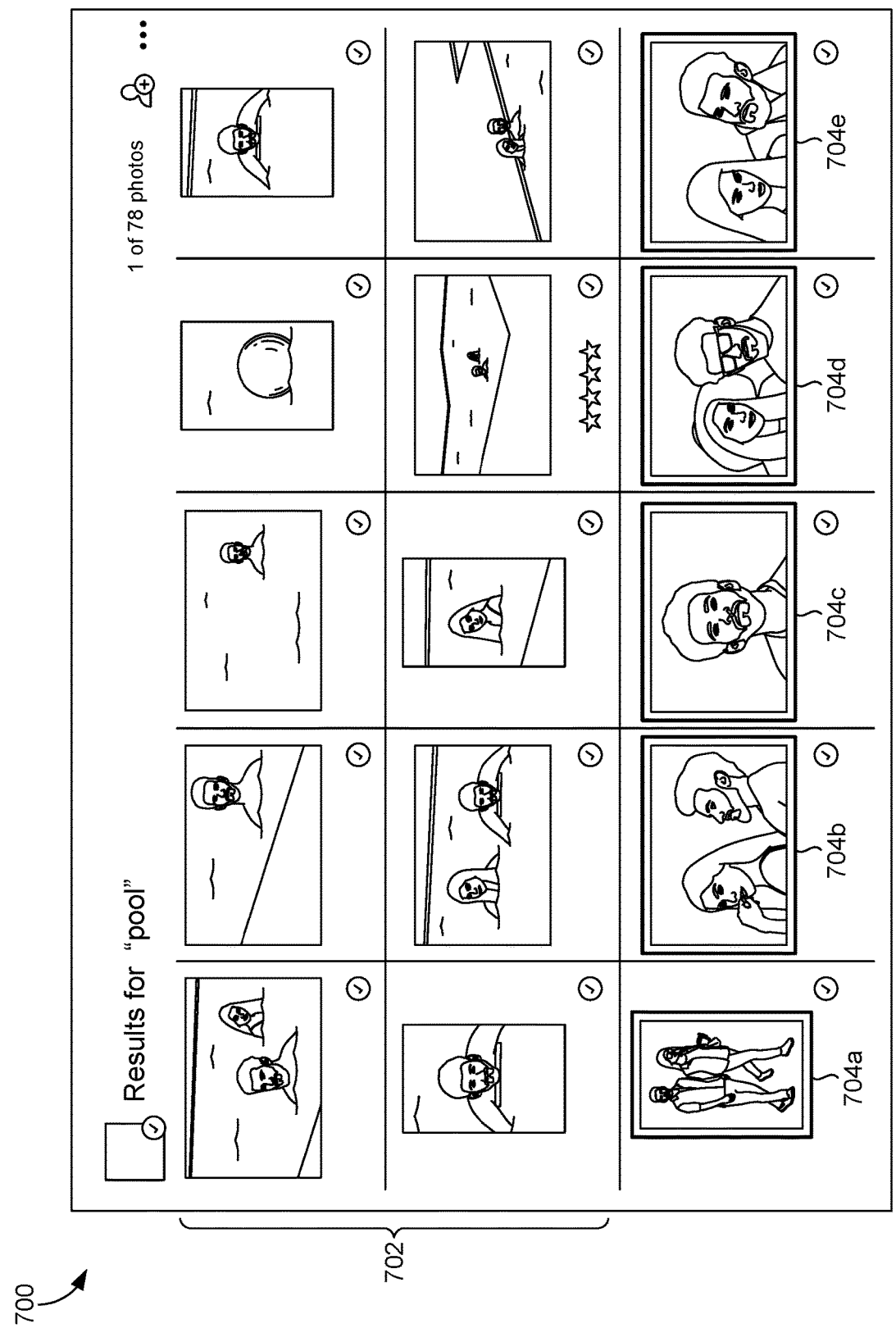
FIG. 7 illustrates an example of a contextual tag image system identifying search results using contextual tags for images based on a contextual analysis of associated images captured in the same environment, in accordance with embodiments of the present disclosure.

FIG. 7 illustrates an example of a contextual tag image system identifying search results 700 using contextual tags for images based on a contextual analysis of associated images captured in the same environment, in accordance with embodiments of the present disclosure, such as those described above in connection with FIGS. 2-6. For instance, FIG. 7 depicts a GUI displaying images comprising search results 700. A search can be input into the contextual tag image system. Such a search can be received from a user, for example, from a user device. Such a search can be "pool."

Content tags and/or contextual tags can be used when a search is performed. Content tags can be based on the content and metadata of an image (e.g., images that visually depict a pool). Such contextual tags can be identified using methods as previously discussed, for example, with reference to FIGS. 2-5. Images identified for a search, using content tags and/or contextual tags, can be output to a user, for example, to the user via a user device. In particular, such identified images can be output as results of the search. In this regard, the identified images can be displayed via a display screen of the user device. For instance, a photo database can be searched for "pool." From such a search, images that visually contain a pool can be returned (e.g., using content tags "pool"). These images identified using content tags for "pool" can be images 702. Images can also be identified for the search "pool" using contextual tags. Such images identified using the contextual tag "pool" do not visually contain a pool. For example, images 702a-702e can be identified using contextual tags "pool." Instead, such images can be images taken in the same environment as images that visually contain the pool (e.g., images 702). To identify such images, contextual tags of an associated category can be used. In particular, such a category can have a list of contextual tags that are assigned to the images associated with the category (e.g., location-based category "pool").

Figure 8:
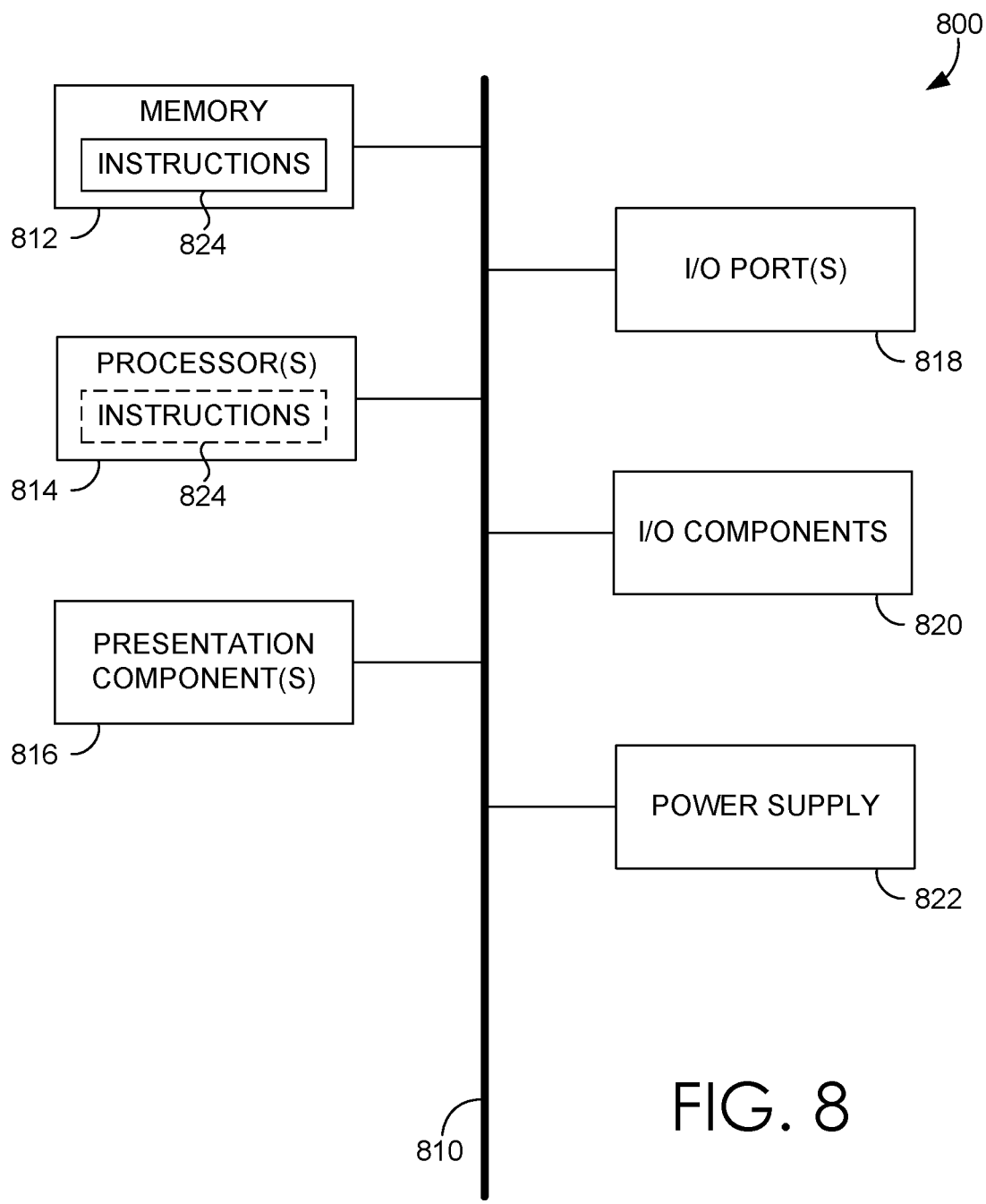
FIG. 8 is a block diagram of an example computing device in which embodiments of the present disclosure may be employed.

Having described embodiments of the present invention, an example operating environment in which embodiments of the present invention may be implemented is described below in order to provide a general context for various aspects of the present invention. Referring to FIG. 8, an illustrative operating environment for implementing embodiments of the present invention is shown and designated generally as computing device 800. Computing device 800 is but one example of a suitable computing environment and is not intended to suggest any limitation as to the scope of use or functionality of the invention. Neither should the computing device 800 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 8, computing device 800 includes a bus 810 that directly or indirectly couples the following devices: memory 812, one or more processors 814, one or more presentation components 816, input/output ports 818, input/output components 820, and an illustrative power supply 822. Bus 810 represents what may be one or more busses (such as an address bus, data bus, or combination thereof). Although the various blocks of FIG. 8 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 8 is merely illustrative of an example computing device that can be used in connection with one or more embodiments of the present disclosure. Distinction is not made between such categories as "workstation," "server," "laptop," "hand-held device," etc., as all are contemplated within the scope of FIG. 8 and reference to "computing device."

Computing device 800 typically includes a variety of non-transitory computer-readable media. Non-transitory Computer-readable media can be any available media that can be accessed by computing device 800 and includes both volatile and nonvolatile media, removable and non-removable media. By way of example, and not limitation, non-transitory computer-readable media may comprise non-transitory computer storage media and communication media.

Non-transitory computer storage media include volatile and nonvolatile, removable and non-removable media implemented in any method or technology for storage of information such as computer-readable instructions, data structures, program modules or other data. Non-transitory computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Non-transitory computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. As depicted, memory 812 includes instructions 824. Instructions 824, when executed by processor(s) 814 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 800 includes one or more processors that read data from various entities such as memory 812 or I/O components 820. Presentation component(s) 816 present data indications to a user or other device. Illustrative presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer-implemented method, comprising:
   determining a first set of content tags for a first image based on content in the first image;
   determining a second set of content tags for a second image based on content in the second image;
   associating the first image with a contextual category based on a determination that the first set of content tags for the first image comprises at least one content tag that relates to the contextual category;
   determining a relevancy of the second image with regard to the contextual category based on a comparison of one or more content tags of the second set of content tags for the second image and one or more content tags of the first set of content tags for the first image;
   associating the second image with the contextual category based on the determined relevancy; and
   assigning, to the second image based on associating the second image with the contextual category, a tag corresponding to a first content tag from the first set of content tags, the tag and the first content tag identifying a visible feature of interest visible in the content of the first image and not visible in the content of the second image.

2. The computer-implemented method of claim 1, the method further comprising:
receiving a search indicating the visible feature of interest; and
identifying the second image using the tag assigned to the second image.

3. The computer-implemented method of claim 2, further comprising:
identifying the first image based on the first content tag of the first set of content tags for the first image.

4. The computer-implemented method of claim 3, further comprising:
upon identifying the second image and the first image, providing the second image and the first image as results for the search.

5. The computer-implemented method of claim 1, further comprising:
grouping, based on location and time, a set of images including the first image and the second image into a cluster.

6. The computer-implemented method of claim 5, further comprising:
creating a multi-layered relationship graph for the set of images.

7. The computer-implemented method of claim 6, wherein the multi-layered relationship graph comprises:
a cluster node comprising the set of images in the cluster and a plurality of content tags for the set of images;
a contextual category layer comprising a location category, an event category, and a non-contextual category;
a contextual tag layer comprising a first list of contextual tags related to the location category and a second list of contextual tags related to the event category;
an image asset layer comprising a first list of images associated with the location category based on one or more content tags of each image from the first list of images and a second list of images associated with the event category based on one or more content tags of each image from the second list of images; and
an associated image layer comprising the first list of images associated with the location category, a third list of images assigned to the location category, the second list of images associated with the event category, and a fourth list of images assigned to the event category.

8. The computer-implemented method of claim 1, wherein associating the first image with the contextual category comprises:
analyzing a first relationship between the first set of content tags and a location category; and
analyzing a second relationship between the first set of content tags and an event category.

9. The computer-implemented method of claim 1, wherein determining the relevancy of the second image further comprises:
identifying a count of overlapping content tags between the second set of content tags for the second image and the first set of content tags for the first image;
normalizing the count of the overlapping content tags; and
generating a relevancy score based on the normalized count indicating a strength of a relationship between the second image and the contextual category.

10. One or more non-transitory computer storage media storing computer-useable instructions that, when used by one or more computing devices, cause the one or more computing devices to perform operations comprising:
determining a first set of content tags for a first image based on content in the first image;
determining a second set of content tags for a second image based on content in the second image;
determining a relevancy of the second image to the first image based on a comparison of one or more content tags of the second set of content tags for the second image and one or more content tags of the first set of content tags for the first image; and
assigning, to the second image based on the relevancy of the first image to the second image, a tag corresponding to a first content tag from the first set of content tags for the first image, the tag and the first content tag identifying a visible object that is visible in the first image and not visible in the second image.

11. The one or more computer storage media of claim 10, the operations further comprising:
receiving a search indicating the visible object; and
identifying the second image using the tag assigned to the second image.

12. The one or more computer storage media of claim 11, the operations further comprising:
identifying the first image based on the first content tag corresponding to the visible object; and
upon identifying the second image and the first image, providing the second image and the first image as results for the search.

13. The one or more computer storage media of claim 10, the operations further comprising:
clustering a plurality of images into related groups, the related groups including a cluster that comprises a set of images including the first image and the second image, wherein the clustering is based on location and time.

14. The one or more computer storage media of claim 10, wherein determining the first set of content tags for the first image comprises:
extracting features from the content of the first image;
encoding the features into representations using a trained convolution neural network; and
classifying the representations to identify the first set of content tags for the first image, the first set of content tags based on the features from the first image.

15. The one or more computer storage media of claim 10, further comprising:
associating the first image with a first contextual category based on the first content tag; and
associating the second image with the first contextual category based on the relevancy of the second image to the first image.

16. The one or more computer storage media of claim 10, wherein determining the relevancy of the second image further comprises:
identifying a count of overlapping content tags between the second set of content tags for the second image and the first set of content tags for the first image;
normalizing the count of the overlapping content tags; and
generating a relevancy score based on the normalized count indicating a strength of a relationship between the second image and the first image.

17. The one or more computer storage media of claim 13, the operations further comprising:
creating a multi-layered relationship graph for the set of images.

18. The one or more computer storage media of claim 17, wherein the multi-layered relationship graph comprises:
- a cluster node comprising the set of images in the cluster and a plurality of content tags for the set of images;
- a contextual category layer comprising a location category, an event category, and a non-contextual category;
- a contextual tag layer comprising a first list of contextual tags related to the location category and a second list of contextual tags related to the event category;
- an image asset layer comprising a first list of images associated with the location category based on one or more content tags of each image from the first list of images and a second list of images associated with the event category based on one or more content tags of each image from the second list of images; and
- an associated image layer comprising the first list of images associated with the location category, a third list of images assigned to the location category, the second list of images associated with the event category, and a fourth list of images assigned to the event category.

19. A computing system comprising:
one or more processors; and
one or more computer storage media storing computer-useable instructions that, when used by the one or more processors, cause the computing system to perform operations comprising:
- determining a first set of content tags for a first image based on content in the first image;
- determining a second set of content tags for a second image based on content in the second image;
- associating the first image with a contextual category based on the first set of content tags for the first image comprising a first content tag relevant to the contextual category;
- associating the second image with the contextual category based on a relevancy of the second image with regard to the contextual category determined using a comparison of the second set of content tags for the second image and the first set of content tags for the first image;
- associating, with the second image, a contextual tag relevant to the contextual category based on associating the second image with the contextual category;
- associating, with the second image, a tag corresponding to a first content tag from the first set of content tags, the tag and the first content tag identifying a visible feature of interest that is visible in the first image and not visible in the second image; and
- in response to a search, identifying the second image based on at least one of the contextual tag and the tag.

20. The computing system of claim 19, wherein the search comprises input identifying the visible feature of interest, and wherein the second image is identified based on the tag.

* * * * *